United States Patent [19]

Grosshandler

[11] 4,059,528

[45] Nov. 22, 1977

[54] CARTRIDGE FILTER

[75] Inventor: Sandor Grosshandler, Middleburgh Heights, Ohio

[73] Assignee: The Dow Chemical Company, Midland, Mich.

[21] Appl. No.: 656,762

[22] Filed: Feb. 9, 1976

[51] Int. Cl.² .............................................. B01D 27/02
[52] U.S. Cl. .................................... 210/282; 210/286; 210/DIG. 26
[58] Field of Search ................ 210/DIG. 26, 40, 263, 210/266, 290, 285, 286, 282, 154, 242 AS, 231; 61/1 F

[56] References Cited

U.S. PATENT DOCUMENTS

| 3,617,551 | 3/1971 | Johnston | 210/40 |
| 3,702,657 | 11/1972 | Cunningham et al. | 210/DIG. 26 |
| 3,739,913 | 6/1973 | Bogosian | 210/DIG. 26 |
| 3,904,528 | 9/1975 | Yocum | 210/DIG. 26 |

Primary Examiner—Wilbur L. Bascomb, Jr.
Assistant Examiner—Benoit Castel
Attorney, Agent, or Firm—R. B. Ingraham

[57] ABSTRACT

Compressible particulate sorbing or filtering media are contained in a filter cartridge comprising a split frame having peripherally disposed inwardly facing clamping ridges. Each portion of the cartridge has a foraminous face through which a fluid may pass within the frame and contained by the foraminous facings is a flexible foraminous member containing the parting sorbent in partially compressed form.

9 Claims, 4 Drawing Figures

CARTRIDGE FILTER

Oftentimes, in the removal of contaminants from fluid stream such as the removal of trace amounts of oil from water, it is desirable to provide a cartridge or self-contained filter element or sorption bed which can be rapidly replaced when it has become saturated with the contaminant. One particularly desirable variety of sorbent bed for use with aqueous streams containing hydrocarbon contaminants such as light oils is a mixed bed of ground plastic foam or synthetic resinous foam and oil imbibing particles or beads. The oil imbibing particles are admixed with the plastic foam which has an oleophilic surface. It is believed in the operation of such sorption beds that the plastic foam presents a relatively large surface to an aqueous stream flowing therethrough and oil becomes sorbed on the surface of the foam. Such particulate foam filters are known and they become saturated with an oily contaminant rapidly. The inclusion of the oil imbibing bead provides a means of removing accumulated oil from the surface of the oleophilic foamed particles thereby clearly increasing the total capacity of the sorptive bed for the oily component. Such beds generally have a low bulk density as the ground foam, without restraint, occupies a relatively large volume for its weight. A mixture of ground foam particles and solid generally spherical beads is highly desirable for the removal of oil from water, however, the oil imbibing particles generally have a much higher bulk density than does the ground plastic foam. In movement or handling of such ground foam plastic particle or bead mixtures, a significant tendency exists for stratification, that is, the oil imbibing particles tend to stratify toward the lower portion of the container and the ground foam particles tend to move toward the upper part of the container. In order for efficient and desirable sorption, this tendency for stratification must be overcome and such mixed sorptive beds must be prepared with great care in order to achieve maximum performance therefrom.

It would be desirable if there were available an improved filter cartridge for the containment of mixed sorptive beds which is compressible and contains particles differing widely in bulk density.

It would also be desirable if there were available an improved filter cartridge for sorptive beds of mixed particulate material wherein one component of the bed has a relatively high bulk density and then another component of the bed has a relatively low bulk density which would tend to prevent stratification of the bed components during handling or fabrication of the cartridge.

It would also be desirable if there were an improved cartridge filter for compressible sorptive beds wherein a sorptive element is relatively easily replaced while maintaining a desired dispersion of two components of a particulate two-component sorptive bed.

These benefits and other advantages in accordance with the present invention are achieved in a filter cartridge, the filter cartridge comprising a hollow frame, the hollow frame having at least a first frame portion and a second frame portion, each of the frame portions being disposed in generally facing mating relationship and means to affix the first frame portion to the second frame portion, the frame defining a generally inwardly facing annular channel, the channel being bounded by inwardly facing channel edges, the channel edges having disposed thereon oppositely disposed sealing ridges or projections, the sealing ridge of the first frame portion and the second frame portion being generally oppositely disposed and dependent toward each other, first and second rigid foraminous sheet members disposed on first and second sealing ridges respectively, the first and second foraminous members being disposed in generally fixed parallel relationship, a flexible foraminous member disposed adjacent and between the first and second rigid foraminous members, a compressible particulate sorptive mass in partially compressed form disposed between the flexible foraminous members and means to prevent substantial fluid flow from the annular groove between the first and second frame portions.

Further features and advantages of the present invention will become more apparent from the following specification taken in connection with the drawing wherein.

Figure 1:
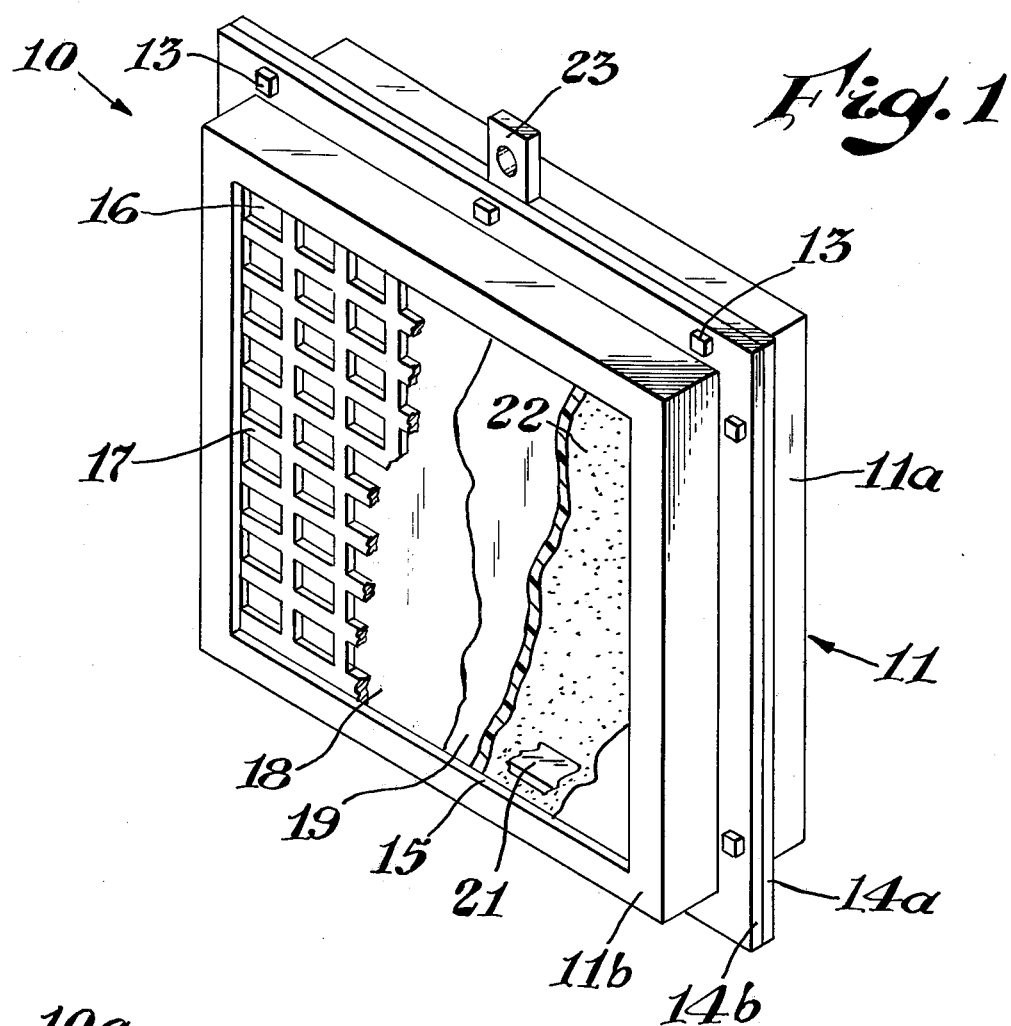
FIG. 1 is a schematic partly cut-away view of a filter cartridge in accordance with the present invention.

In FIG. 1 there is schematically depicted a partially cut-away view of a filter cartridge or sorptive cartridge in accordance with the present invention generally designated by the reference numeral 10. The cartridge 10 comprises in cooperative combination a frame 11. The frame 11 comprises a first frame portion 11a and a second frame portion 11b. The frame portions 11a and 11b are of generally similar configuration and are maintained in mating fixed relationship by means of a plurality of fastening means or bolts 13. The frame portion 11a has a generally radially outwardly extending flange portion 14a. A similar flange portion 14b is affixed to frame portion 11b. The bolts 13 pass through flanges 14a and 14b. The frame 11 defines an inwardly facing annular channel 15. The frame portion 11b defines a generally rectangular fluid passage opening 16 disposed in a plane generally parallel to the flange 14b. A similar opening is defined by the frame portion 14a and is not shown. Disposed within and retained by frame 11 is a first rigid foraminous sheet 17 disposed immediately adjacent and within the opening 16 of frame portion 11b. The rigid foraminous sheet 17 extends into the annular groove 15 of the frame 11. A second generally foraminous rigid sheet 18 is disposed adjacent foraminous sheet 17 and is generally coextensive with the sheet 17. The sheet 18 is spaced from adjacent portions of the frame 11 by the sheet 17. A flexible foraminous sheet 19 is disposed immediately adjacent the sheet 18 and remote from the sheet 17. The sheet 19 is generally coextensive with the sheet 18 and at least a portion of the groove 15. A similar series of sheets equivalent to sheets 17, 18 and 19 are disposed within the opening of the frame portion 11a and are similarly arranged. An internal generally rectangular frame 21 is disposed within the frame 11. The internal frame 21 has a generally rectangular configuration and is of a dimension somewhat smaller than the opening 16 of the frame 11. A particulate sorptive bed 22 is disposed within the cartridge 10 and is immediately adjacent the flexible foraminous sheet 19 and its couterpart disposed in frame portion 11a. For convenience in handling, frame portion 11a has disposed thereon a lifting lug 23.

Figure 2:
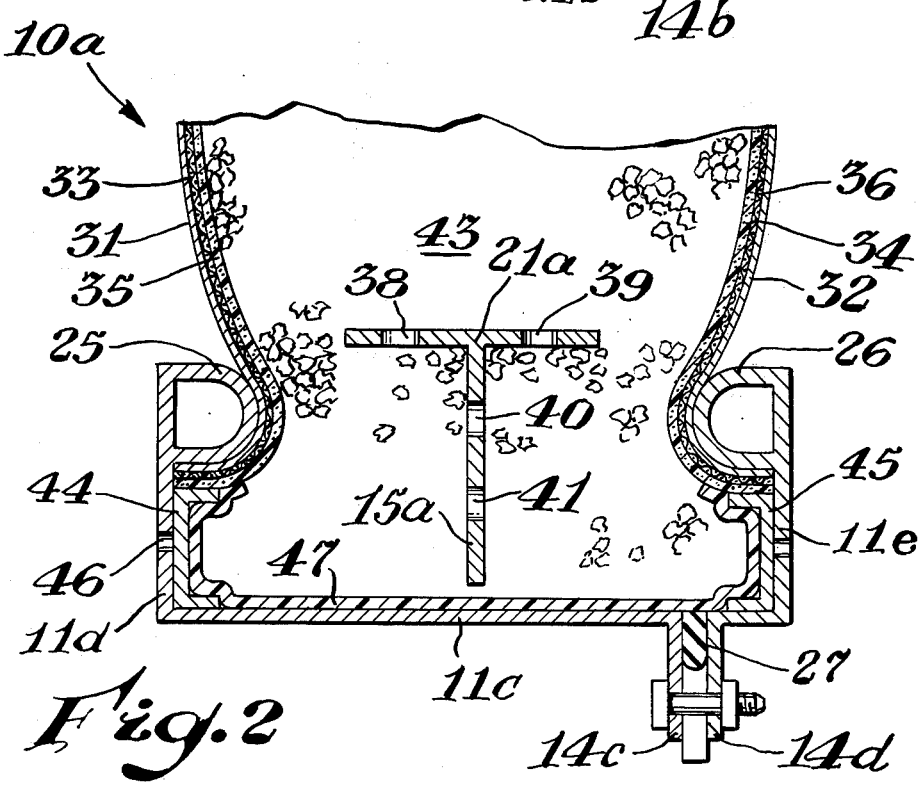
FIG. 2 is a schematic fractional sectional view of a cartridge generally equivalent to that shown in FIG. 1.

In FIG. 2 there is a schematic fractional sectional view of a filter cartridge in accordance with the present invention generally designated by the reference numeral 10a. The internal construction of the cartridge 10a is generally identical to the construction of cartridge 10 of FIG. 1. A frame 11c having a first frame member 11d and a second frame member 11e defines an internal generally annular channel 15a. The frame member 11d defines an inwardly projecting clamping or pressure ridge 25. A second pressure ridge 26 is defined by the frame member 11e. The pressure ridges 25 and 26 are inwardly disposed with respect to a central axis of the frame passing through openings equivalent to the opening 16 of the FIG. 1. The pressure ridges 25 and 26 are disposed in facing relationship and extend inwardly into the channel 15a. A gasket or liquid sealing means 27 is disposed between adjacent flanges 14c and 14d of the frame members d and e, respectively. The pressure ridges 25 and 26 have disposed thereon rigid foraminous sheets 31 and 32 respectively. The sheets 31 and 32 are generally equivalent to the sheet 17 of FIG. 1. The sheets 31 and 32 extend into the channel 15a and are conformed to the configuration of the pressure within 25 and 26 respectively. A second rigid foraminous sheet 33 is disposed immediately adjacent sheet 31 and a similar sheet 34 is disposed adjacent sheet 32. The openings in the sheet 33 and 34 are substantially smaller than the openings in sheets 31 32. A flexible foraminous sheet 35 is disposed immediately adjacent the sheet 33. A similar sheet 36 is disposed adjacent the sheet 34. A generally rectangular inner frame 21a is disposed within the frame 11c. The frame 21a is disposed partially within the channel 15a and is surrounded by the frame 11c and generally centrally located therein. The frame 21a as depicted in FIG. 2 has a generally T-shaped cross-sectional configuration and defines a plurality of fluid passageways 38, 39, 40 and 41 throughout the cross of the T and the vertical portion thereof. A particulate bed 43 is disposed within the space enclosed by the frame 11c and the flexible foraminous sheets 35 and 36. The inner frame 21a is maintained in spaced relationship from the frame 11c by means of the particulate bed. The sheets 31, 33 and 35 are maintained in fixed position adjacent the edge 25 by means of a wedge bar or batten 44. A similar batten 45 affixes the sheets 32, 34 and 36 adjacent the pressure ridge 26. Beneficially, the battens 44 and 45 may be one piece construction and in the form of a hollow rectangle or alternately each of the battens may comprise four or more individual pieces. The frame 11c defines an opening 46 adjacent the batten 44 which permits entry of a punch for removal of the batten when necessary. A gasket sheet 47 is disposed at the bottom of the channel 15a and extends between the foraminous sheets 35 and 36.

The embodiment of FIG. 2 is particularly suitable if the particular material is provided in bulk or is mixed on site for charging of the filter cartridge.

Filter cartridges such as filter cartridges of FIG. 2 are readily emptied and filled by placing the cartridge with frame portion 11d, bottommost, removing the frame portion 11e, removing the particulate material from the bed and frame 21a by deflecting the deflectable gasket 47, removing the remainder of the bed material, adding fresh material to fill the frame member 11d to a level a bit greater than 50 percent. The inner frame 21a is then positioned in the bed and additional bed material is added until the frame portion 11c is overfilled, for example, by about 20 percent. A frame member 11e is then positioned over the frame member 11d and the frame members drawn together to compress the compressible bed material.

Figure 3:
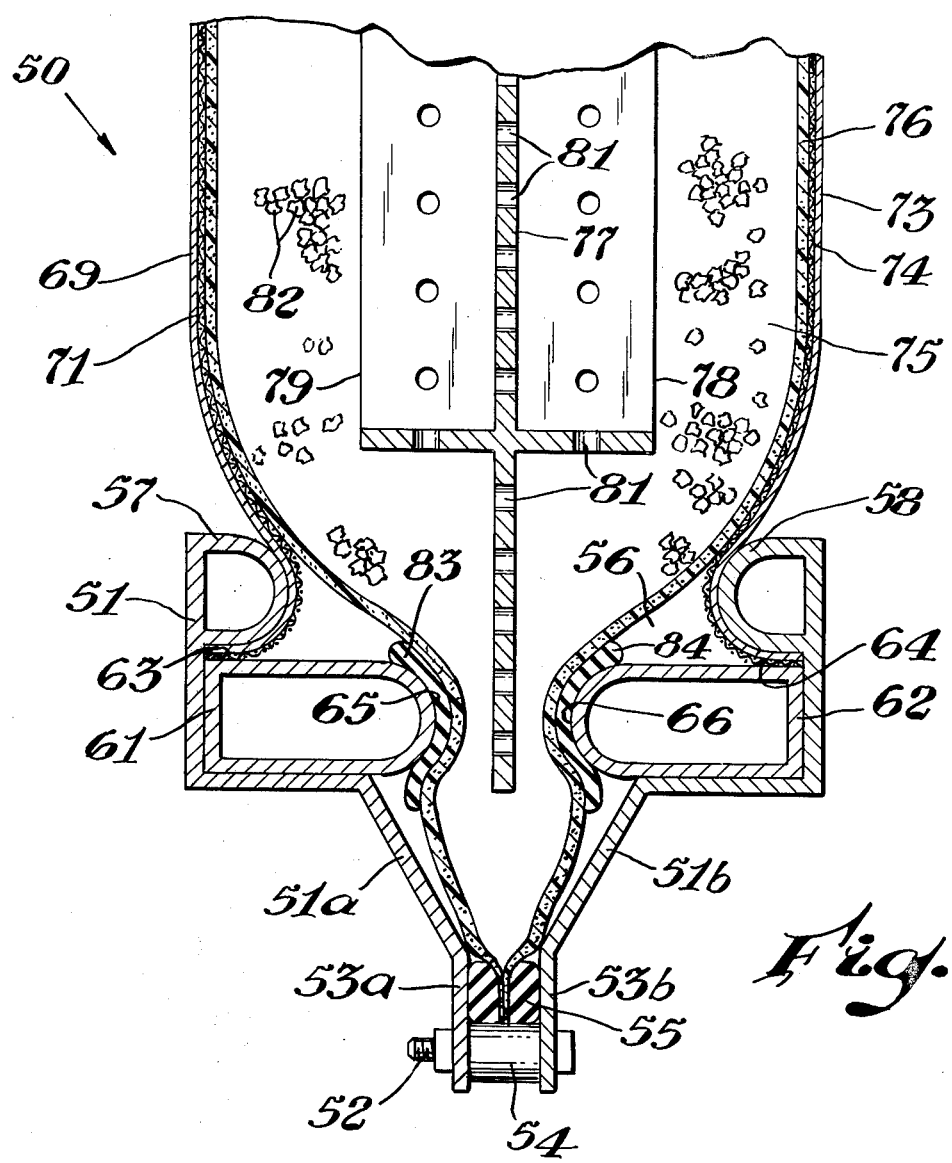
FIG. 3 is a fractional sectional view of an alternate cartridge in accordance with the invention.

In FIG. 3 there is schematically depicted a fractional sectional cross-sectional representation of an alternate embodiment of the present invention generally designated by the reference numeral 50. The cartridge 50 has a frame 51. The frame 51 is of generally hollow annular rectangular configuration. The frame 51 comprises a first frame member 51a and a second frame member 51b. Frame members 51a and 51b are of generally identical construction and have a mirror image relationship. The frame portions 51a and 51b are maintained in fixed spaced-apart relationship by means of a bolt 52 passing through flange portions 53a and 53b of frame portions 51a and 51b respectively. A spacer 54 is disposed between the flanges 53a and 53b to maintain a fixed spaced relationship therebetween. A split or two piece generally annular gasket 55 is in liquid sealing relationship with opposite faces of the flanges 53a and 53b. The frame 51 defines a generally annular inwardly facing cavity 56. The frame 51 defines a first or inner pressure members 57 and 58. The pressure members 58 are disposed on the inner terminal portions 51 and extend thereabout. The pressure members 57 project inwardly into the annular cavity 56. Disposed within the annular cavity 56 are a first batten and pressure member 61 and second batten and pressure member 62. The members 61 and 62 are exterior to the pressure members 57 and 58 and are generally coextensive therewith. The pressure member 61 defines a first clamping face 63 disposed adjacent the pressure member 57. A similar clamping face 64 is defined by the pressure member 62. The member 61 defines an arcuate pressure face 65 generally remotely disposed from the pressure member 57. A similar face 66 is defined by the pressure member 62. The faces 65 and 66 are in generally opposed spaced-apart relationship. A first generally rigid foraminous sheet 69 is disposed over the pressure member 57. A second less rigid foraminous sheet 71 is generally coextensive with the sheet 69. The sheets 69 and 71 are maintained in position by the wedging action of the pressure member 57 and the face 63 of the pressure member 61. The pressure member 61, in effect, acts as a wedging batten to maintain the sheets 69 and 71 in position. Generally oppositely disposed to the sheets 69 and 71 is rigid foraminous sheet 73 and a less rigid foraminous sheet 74 clamped to the pressure member 58 by means of the pressure member 62 which acts in a similar manner to the pressure member 61. The frame 51, sheets 69 and 73 serve to define an internal space which encloses a package 75. The package 75 comprises a foraminous external envelope 76 beneficially of a material such as open-cell synthetic resinous foam, fabric or the like. Within the envelope 76 is disposed a generally planar inner sheet 77. The sheet 77 beneficially has first and second flanges 78 and 79 respectively disposed generally adjacent but encircled by pressure members 57 and 58. The sheet 77 has a configuration generally similar to the frame 51, that is, if the frame 51 is rectangular, the inner sheet 77, and flanges 78 and 79 are also rectangular; if the frame 51 is circular, the inner frame 77 and flanges 78 and 79 are also circular. As depicted in FIG. 3, the inner sheet 77 defines a plurality of openings 81. The inner sheet 77 is of a lesser dimension than the frame 51 and is maintained in generally fixed spaced relationship thereto by means of a sorptive particulate bed 82 contained within the envelope 76 and is compressed thereby. A first annular gasket 83 is disposed between the facing 65 of the member 61 and adjacent portion of the envelope 76. A similar gasket 84 is disposed between the surface 66 of memmber 62 and the adjacent portion of the envelope 76. The edge portions of the envelope 76 are clamped between the portions of the split gasket 55. The embodiment of FIG. 3 is particularly adaptable to a change of the sorptive media by removing the envelope 76 therefrom after separating the frame portion 51a and 51b. An unused envelope 76 containing the sheet 77 and bed 82 is positioned within a frame portion such as a frame portion 71a. The bed 82 is distributed within the envelope by appropriate shaking, patting and the like manipulation of the envelope if necessary. The second portion of the frame 51b and gasket 84 are positioned over frame portion 51a. Sufficient pressure is applied to frame portion 51b, for example, by applying the weight of one or more human bodies. The flange portions 53a and 53b are brought into engagement with the gasket 55 and spacer 54. Bolts such as the bolts 52 are then tightened.

Figure 4:
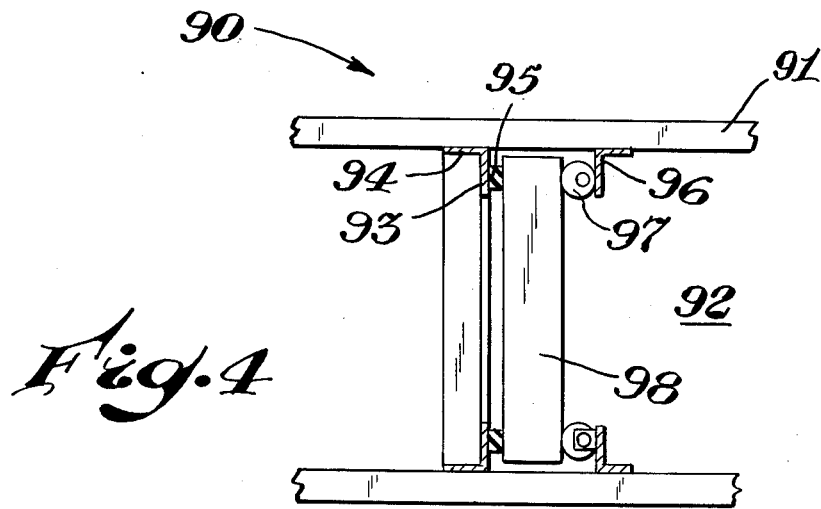
FIG. 4 is a schematic plan view of a cartridge of the present invention installed in a flume.

FIG. 4 schematically depicts a filter installation generally designated by the reference numeral 90. The installation 90 comprises a duct or flume 91 having an open top portion 92. Within the flume 91 is disposed a first generally U-shaped filter cartridge receiving means 93 which beneficially comprises an angle member 94 having disposed thereon a gasket 95. A generally U-shaped locking or clamping mechanism 96 is disposed in generally fixed spaced relationship to the gasket 95. Locking mechanism 96 has a plurality of cams 97. A filter cartridge 98 in accordance with the present invention is disposed between the gasket 95 and the cams 97. The cartridge 98 is maintained in liquid sealing engagement with the gasket 95 by the pressure exerted by the cams 97.

The precise amount of compression employed in the preparation of filter cartridges prepared in accordance with the present invention will vary with the density and size of the particulate sorbent used; for example, if the bed contains a ground flexible low-density polyethylene foam, the amount of compression required to maintain such a particulate material in position under any given flow conditions will be different than the amount of pressure required if the sorbent bed is a relatively rigid material such as a higher density polystyrene foam. When mixed beds are employed, that is, beds which employ a low density particulate component such as plastic foam and a high density particulate component, such as an oil imbibing bead the amount of compression of the beds must be sufficient that under the flow conditions stratification of the two components does not occur. The amount of compression for any particulate bed generally may be determined by placing bed samples of desired compositional balance in a three-inch glass tube with an appropriate fixed screen at one end and an adjustable screen at the other. The adjustable screen is readily supported by a tubular spacer end of glass or an appropriate plastic tube to give a desired degree of compression and liquid or gas passed through at a desired flow rate. If stratification of the bed does not occur, the degree of compression is sufficient. The degree of compression of the bed about the periphery of the bed in the region of the inwardly facing clamping members is desirably greater than compression in central portion of the bed thereby maintaining the bed in a fixed position relative to the flume. The relative degree of compression will of course vary with the particular bed mixture chosen for a specific application.

Cartridges in accordance with the present invention may be employed with a wide variety of compressible filter media including ground plastic foams, rubber foams, inorganic foams such as glass foams, organic fibers, natural fibers, inorganic fibers, materials such as expanded perlite, vermiculite and the like either alone or in admixture.

Filter cartridges in accordance with the present invention are particularly desirable for applications wherein large volumes of flow are to be employed under low pressures such that are encountered in a flume, aquaduct or other open top channel.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A filter cartridge, the filter cartridge comprising a hollow frame defining therein a fluid passage opening for liquid to pass through, the hollow frame having at least a first frame portion and a second frame portion, each of the frame portions being disposed in generally facing mating relationship and means to affix the first frame portion to the second frame portion, the hollow frame defining a generally inwardly facing annular channel, the channel being bounded by inwardly facing channel edges and surrounding the fluid passage opening, the channel edges having disposed thereon oppositely disposed sealing ridges or projections, the sealing ridge of the first frame portion and the second frame portion being generally oppositely disposed and dependent toward each other, first and second rigid foraminous sheet members disposed on first and second sealing ridges respectively, the first and second foraminous members being disposed in generally fixed parallel relationship across the fluid passage opening, first and second flexible foraminous members disposed adjacent, and between the first and second rigid foraminous members respectively, the first and second both rigid and flexible sheets extending into the annular channel a compressible particulate sorptive mass in partially compressed form disposed between the flexible foraminous members the amount of compression being sufficient to maintain the mass in position so that stratification does not occur under desired flow conditions and means to prevent substantial fluid flow from the annular channel between the first and second frame portions.

2. The filter cartridge of claim 1 including a second frame encircled by the hollow frame, the second frame being disposed within and maintained in position by the compressible particulate sorptive mass, said second frame defining at least one fluid passageway therethrough.

3. The filter cartridge in accordance with claim 1 wherein the compressible particulate sorptive mass comprises a plastic foam and oil imbibing plastic particles.

4. The filter cartridge of claim 1 wherein the hollow frame is a generally rectangular configuration.

5. The filter cartridge of claim 1 wherein the compressible particulate sorptive mass comprises a rubber foam and oil imbibing plastic particles.

6. A filter cartridge, the filter cartridge comprising a hollow frame defining therein a fluid passage opening for liquid to pass through, the hollow frame having at least a first frame portion and a second frame portion, each of the frame portions being disposed in generally facing mating relationship and means to affix the first frame portion to the second frame portion, the hollow frame defining a generally inwardly facing annular channel, the channel being bounded by inwardly facing channel edges and surrounding the fluid passage opening, the channel edges having disposed thereon oppositely disposed sealing ridges or projections, the sealing ridge of the first frame portion and the second frame portion being generally oppositely disposed and dependent toward each other, first and second rigid foraminous sheet members disposed on first and second sealing ridges respectively, the first and second foraminous members being disposed in generally fixed parallel relationship across the fluid passage opening, first and second flexible foraminous members disposed adjacent, and between the first and second rigid foraminous members respectively, the first and second both rigid and flexible sheets extending into the annular channel a compressible particulate sorptive mass in partially compressed formed disposed between the flexible foraminous members the amount of compression being sufficient to maintain the mass in position so that stratification does not occur under desired flow conditions and means to prevent substantial fluid flow from the annular channel between the first and second frame portions with the further limitation including a second frame encircled by the hollow frame, the second frame being disposed within and maintained in position by the compressible particulate sorptive mass said second frame defining at least one fluid passageway therethrough.

7. The filter cartridge in accordance with claim 6 wherein the compressible particulate sorptive mass comprises a plastic foam and oil imbibing plastic particles.

8. The filter cartridge of claim 6 wherein the hollow frame is a generally rectangular configuration.

9. The filter cartridge of claim 6 wherein the compressible particulate sorptive mass comprises a rubber foam and oil imbibing plastic particle.

* * * * *